April 22, 1969 F. KAMMER 3,440,427

REMOTE CONTROL SYSTEM WITH A UNITARY CELL BRIDGE CIRCUIT

Filed April 12, 1966 Sheet 1 of 2

INVENTOR.
FRANZ KAMMER

BY

AGENT

INVENTOR.
FRANZ KAMMER
BY Frank R. Trifari
AGENT

United States Patent Office 3,440,427

Patented Apr. 22, 1969

3,440,427

REMOTE CONTROL SYSTEM WITH A UNITARY CELL BRIDGE CIRCUIT

Franz Kammer, Blair Athol, Queensland, Australia, assignor, by mesne assignments, to U. S. Philips Corporation, New York, N.Y., a corporation of Delaware Filed Apr. 12, 1966, Ser. No. 542,140
Int. Cl. H01j 39/12
U.S. Cl. 250—210 7 Claims

ABSTRACT OF THE DISCLOSURE

A control system for remotely operating a device, such as a television receiver, by means of a polarized light beam. The system includes a bridge circuit having at least two light-sensitive resistance arms in a unitary structure, and polarized filter means with different polarization regions aligned with the areas of the light-sensitive regions corresponding to different arms of the bridge circuit.

The invention relates to a method of and a device for the remote control of a receiver for electromagnetic waves, for example, a television or radio-receiver.

Basically, this invention involves the use of a light-sensitive element at or in the receiver and a light emitter at the control device, the latter being constructed so as to emit polarized light, and the light-sensitive element being constructed so as to respond to light having a given polarization direction. In this way, the light-sensitive device can be operated where there is a relatively high background level of ordinary ambient light.

For that purpose, the invention is characterized in that polarized light from a light source is directed onto two or more parts of a light-sensitive element which are separated electrically and incorporated in a bridge, for example, a light-sensitive resistor, the said elements receiving mutually differently polarized light so that the bridge is unbalanced and a relay is operated which switches the receiver from the adjusted frequency band to a different frequency band.

Preferably, though not essentially, a plurality of light-sensitive elements are employed in the device to be controlled, the various elements being arranged close together and connected in a bridge circuit. In such a case, the sensitivity of the various elements to light polarized in a given direction should vary from element to element in order to enhance the differential output and to further discriminate against ordinary ambient light. The light-sensitive element can be light-dependent resistors arranged in the arms of a bridge.

The control device may simply comprise an incandescent filament lamp and a polarizing filter, the transmitted light beam passing through the filter. The direction of polarization of the emitted light is suitably chosen by rotating the filter.

In order that the invention may readily be carried onto effect, it will now be described in greater detail, by way of example, with reference to the accompanying drawings, in which.

Figure 1:
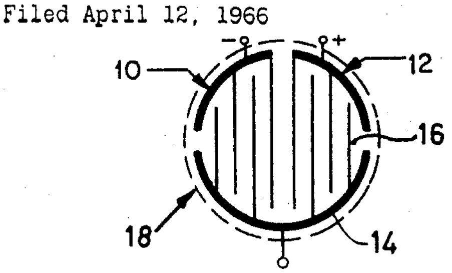
FIGURE 1 is a plan view of the surface of a light-depedent resistor suitable for use in connection with the first embodiment of this invention.

Light-dependent resistors are well-known and, where high sensitivity is to be combined with low internal resistance, the active element of such resistor is usually a cadmium sulphide preparation. The resistor is formed by depositing a thin layer of the active material on an insulating substrate and then forming two or more conductors or electrodes in or on the material so that the device can be connected to an external circuit. By suitably designing the configuration of these electrodes and by forming insulating slots within the material, it is possible to obtain a wide range of resistant values. In the first embodiment of this invention, as will be seen by FIGURE 1, light-sensitive resistors are used having two oppositely located electrodes 14 and 10, 12. Parallel strips are arranged in the cadmium sulphide layer 16 between the electrodes 14 and the two-element electrodes 10, 12. The (conductive) strips are interleaving. In this way thhe two-element light-sensitive resistor 18 is formed.

Figure 2:
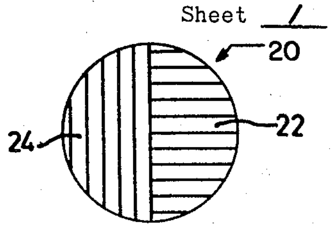
FIGURE 2 is a schematic representation of a polarizing filter which can be used in front of the light-dependent resistor of FIGURE 1.

The light-dependent resistor 18 is mounted on or within the receiver so that, as far as possible, it is shielded from the ambient light and located where it is conveniently accessible to the polarized light beam emitted by the light-emitting element. Immediately in front of the light-dependent resistor 18 a polarizing filter 20 is located so that a substantial proportion of any light falling upon the receiver 18 is polarized. As shown in FIGURE 2, the polarizing filter 20 is diametrically divided into two portions, one half 22 being arranged to polarize light passing therethrough in one plane and the other half 24 being adapted to polarize the light passing therethrough in an orthogonal plane. Thus, if the filter 20 is superimposed upon the light-dependent resistor 18 so that the dividing line between its halves lies directly between the electrodes 10 and 12, the resistance of the cadmium sulphide between the electrode 10 and the common electrode 14 depends upon the amount of light reaching the resistor 18, the polarization plane of which is determined by the filter portion 24, while the resistance of the material between the electrodes 12 and 14 depends upon the amount of light which reaches the resistor 18, the plane of polarization of which is determined by the filter portion 22.

Figure 3:
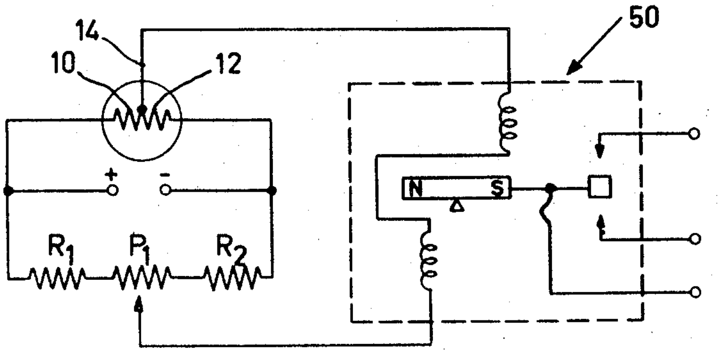
FIGURE 3 is a circuit diagram showing the way in which the light-dependent resistor of FIGURE 1 may be connected in a bridge circuit.

Referring now to FIGURE 3 of the drawings, the light-dependent resistor 18 forms part of a bridge circuit associated with the receiver and in which the cadmium sulphide between the electrodes 10 and 14 and that between the electrodes 12 and 14 each form one arm of the bridge and the resistors $R_1$ and $R_2$ are included in the other arm. In said other arms is also incorporated a balancing potentiometer $P_1$. The load diagonal of the bridge, i.e., the diagonal between the sliding contacts of the potentiometer $P_1$ and the electrode 14, is connected parallel to a polar relay 50 which controls the desired functions in the receiver. If desired, a D.C. amplifier may be interposed between the bridge circuit and the relay 50 to increase the power supplied thereto.

If the transmitted light beam is obtained, for example, from an ordinary hand-held torch which incorporates a simple polarizing filter which passes linearly polarized light, the amount of light falling on each half of the light-dependent resistor 18 will depend upon the angle between the plane of polarization of the filter within the torch and the dividing line of the two halves 24 and 22 of the polarizing filter 20 which is placed in front of the light-dependent resistor 18. Any such difference will cause unbalance in the D.C.-bridge and current flow through the polar relay 50 in the direction of current being determined by which half of the light-dependent resistor receives most light. Thus, if the unbalance is sufficient, the polar relay 50 will be operated in the appropriate manner and the desired control exerted. Since the two halves of the light-dependent resistor 18 are in such close juxtaposition, the same amount of ambient light, being not polarized, will also reach each half of the resistor through the filter 20. However, although the resistance of each element consequently is correspondingly affected, the bridge circuit is not unbalanced by the ambient light.

If the two resistors $R_1$ and $R_2$ would be replaced by the two halves of another light-dependent resistor it would be possible to further increase the sensitivity of the device by arranging a polarizing filter in front of the second composite resistor which is similar to the filter 20 but has the halves 22 and 24 reversed. Taking the matter further, the two composite light-dependent resistors can be incorporated in one housing, and the associated polarizing filter can be divided into quadrants of appropriately chosen direction of polarization.

Figure 4:
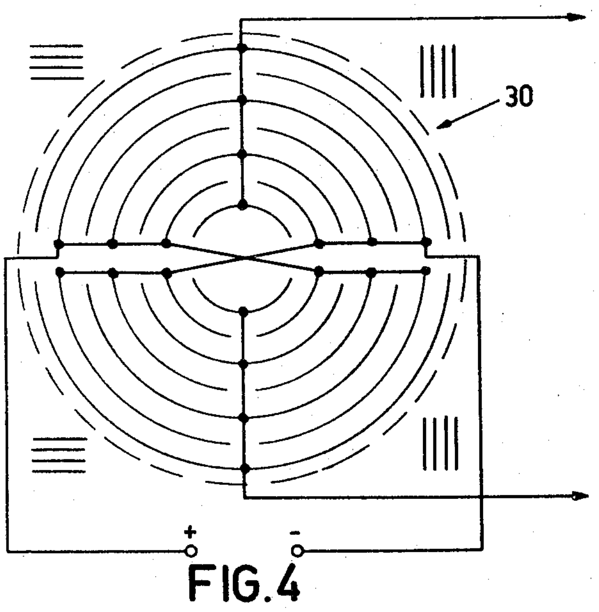
FIGURE 4 is a view of a modified light-dependent resistor similar to that of FIGURE 1.

A second embodiment of this invention includes a light-dependent resistor 30 (see FIGURE 4) in which the elements are electrically reversed so that the two-part polarizing filter of FIGURE 2 can be used. In FIGURE 4, the horizontal and vertical lines associated with each quadrant of the light-dependent resistor 30, indicate the direction of polarization of the associated filter.

Although the second embodiment employs a bridge circuit like that of FIGURE 3, the load diagonal of the bridge is not connected across the polar relay but is connected to an A.C.-amplifier, and pulse shaper 32 which drives a stepping motor 34. The stepping motor 34 can operate a selector switch or the like for the control of the device concerned.

Figure 5:
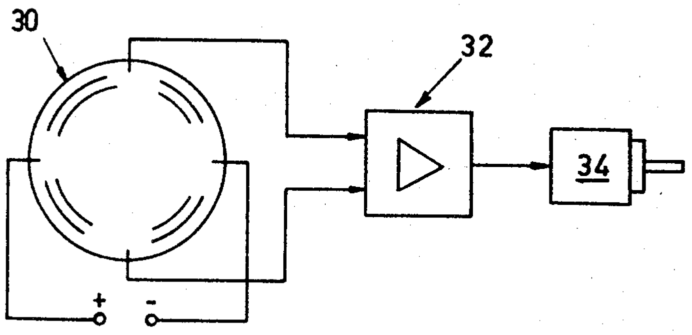
FIGURE 5 is a circuit diagram showing how the modified light-dependent resistor of FIGURE 4 may be incorporated in an alternative control system and FIGURE 6 is a schematic section of a light-source suitable for use in either of the embodiments shown.
Figure 6:
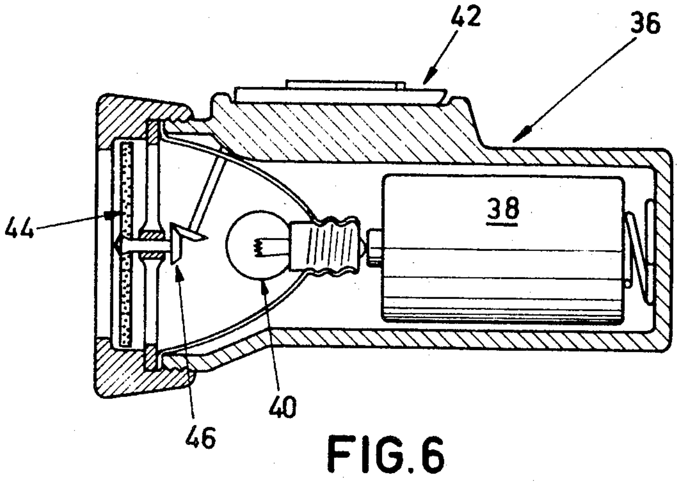

In order to generate the requisite output pulses from the light-dependent resistor 30 shown in FIGURE 4 connected in a bridge as shown in FIGURE 5, the polarizing filter of the torch which passes linearly polarized light, must be rotated through a pre-determined angle, at right angles to the light-beam. In the present case, a 180°-rotation of the torch filter will generate one complete cycle of the voltage variation at the output of the bridge-connected light-dependent resistor 30. This output voltage is transformed by the amplifier and the pulse shaper 32 into square-shaped pulses suitable for driving the stepping motor 34. The transmitting torch 36 shown in FIGURE 6 includes a battery 38 which energizes a lamp 40 and a clockwork dial mechanism 42 which rotates the polarizing filter 44 through a predetermined angle or given number of revolutions. The dial mechanism 42 may have a similar appearance to a telephone dial and, when released after indexing, rotates the filter 44 the appropriate amount by means of the gear train 46.

It will be seen from the above description that the particular embodiments described fulfill the object and display the advantages required for a simple television remote control system; however, the invention is not strictly limited thereto as many other applications can be found and many modifications and additions can be made to the embodiments without departing from the scope of the present invention. It is not essential, for example, to employ light-dependent resistors as the photosensitive devices but photovoltaic and photoemissive devices may also be employed, although these are generally more expensive than the light-dependent resistors. Similarly, it is not necessary to employ a bridge circuit of the type shown, but other circuits achieving the same results can be utilized. Furthermore, it is obviously a matter of choice as to the device which is finally operated from the circuit incorporating the photosensitive elements, whether a polar relay, stepping motor, uniselector or the equivalent. Finally, to assist the operator in the aiming or pointing of the torch or other light source at the photocell, a cross, concentric circle or the like pattern may be formed by reflective tape or the like about the cell. Thus, light reflected from the tape provides an indication of whether the torch is correctly aimed at the cell. These and many other variations can be made without departing from the scope of the invention herein described.

What is claimed is:

1. A control system responsive to the reception of polarized light, said system comprising a light-sensitive resistor having first, second and third conductive electrodes on a unitary layer of light-sensitive resistance material, with said first electrode having portions interleaving portions of said second and third electrodes respectively in first and second adjacent areas respectively of said layer, first and second impedance means, means interconnecting said first and second impedance means and said first, second and third electrodes to form a bridge circuit whereby the resistance of said material between said first and second electrodes and between said first and third electrodes are in separate adjacent arms of said bridge circuit, a source of potential connected between first and second opposite terminals of said bridge circuit, an output circuit connected between the remaining terminals of said bridge circuit, and a light polarizing filter positioned in front of said layer and having first and second regions of different polarization aligned with said first and second arms respectively.

2. The control system of claim 1 wherein said source of potential is a source of direct voltage and said output circuit comprises an alternating current amplifier, said system further comprising a source of light for directing a beam of polarized light toward said light dependent resistor, said source comprising means for rotating the plane of polarization of light of said light beam, whereby the output of said bridge circuit has at least one complete cycle of voltage variation.

3. The control system of claim 2 wherein said source of light comprises a lamp, a rotatable polarized filter positioned in front of said lamp, and clockwork means connected to rotate said rotatable filter.

4. A control system responsive to the reception of polarized light, comprising a bridge circuit, a source of voltage connected between one pair of opposite terminals of said bridge circuit, output circuit means connected to the other pairs of opposite terminals of said bridge circuit, said bridge circuit comprising a unitary layer of a light-sensitive resistance material, and four electrodes positioned on said layer and forming the four terminals of said bridge circuit, whereby the separate arms of said bridge circuit are formed by the resistance of separate areas of said layer, and a polarizing filter positioned in front of said layer, said filter having at least one region of a first polarization direction aligned with areas of said layer corresponding to a first pair of opposite arms of said bridge circuit, and at least one region of a second polarization direction normal to said first direction and aligned with the second pair of opposite arms of said bridge circuit.

5. The system of claim 4 wherein said source of voltage is a source of direct voltage and said output circuit comprises an alternating current amplifier, said system further comprising a source of light for directing a beam of light having a rotating polarization toward said layer by way of said polarizing filter.

6. The system of claim 5 wherein said source of light comprises a lamp, a rotatable polarized filter positioned in front of said lamp, and clockwork means connected to rotate said rotatable filter.

7. The system of claim 4 wherein said separate areas are four quadrants of a circular region of said layer, and said polarizing filter is circular with one semicircular area having said first polarization direction and the other semicircular area having said second polarization direction.

(References on following page)

References Cited

UNITED STATES PATENTS

| | | | |
|---|---|---|---|
| 2,140,368 | 12/1938 | Lyle | 250—225 |
| 2,362,832 | 11/1944 | Land | 250—225 |
| 2,999,240 | 9/1961 | Nicoll | 136—89 |
| 3,248,549 | 4/1966 | Sanabria | 250—210 |
| 3,270,206 | 8/1966 | Kazan | 250—210 |
| 3,272,065 | 9/1966 | Jinichito et al. | 250—210 |

JAMES W. LAWRENCE, *Primary Examiner.*

D. O'REILLY, *Assistant Examiner.*

U.S. Cl. X.R.

178—6; 250—211, 225; 315—159